United States Patent [19]
Marendaz

[11] 3,860,779
[45] Jan. 14, 1975

[54] METHOD AND APPARATUS FOR POSITIONING AN ELECTRODE-TOOL RELATIVE TO A WORKPIECE IN ELECTRICAL DISCHARGE MACHINING

[75] Inventor: Georges-Andre Marendaz, Geneva, Switzerland

[73] Assignee: Ateliers des Charmilles S.A., Geneva, Switzerland

[22] Filed: Apr. 13, 1973

[21] Appl. No.: 350,729

Related U.S. Application Data

[63] Continuation-in-part of Ser. No. 236,826, March 22, 1972, Pat. No. 3,739,136.

[30] Foreign Application Priority Data
Apr. 21, 1972 Switzerland.......................... 5908/72

[52] U.S. Cl............ 219/69 G, 219/69 M, 219/69 C
[51] Int. Cl................................................ B23p 1/08
[58] Field of Search..... 219/69 C, 69 G, 69 P, 69 M

[56] References Cited
UNITED STATES PATENTS
3,705,287  12/1972  Saito et al. ......................... 219/69 P
3,739,136  6/1973  Marendaz ......................... 219/69 C

*Primary Examiner*—Bruce A. Reynolds
*Attorney, Agent, or Firm*—Hauke, Gifford, Patalidis & Dumont

[57] ABSTRACT

A method and apparatus for maintaining the gap spacing between the electrode-tool and the workpiece, in electrical discharge machining, at an optimum value providing maximum material removal efficiency and minimum electrode-tool wear. The machining gap is automatically and adaptively maintained at its optimum value by comparing two electrical reference magnitudes, one which varies as a function of the average value of the time delays occurring between the moment at which the machining voltage is applied across the gap and the moment at which the electrical discharge takes place, and the other which is proportional to the rate of gap short circuits, and by deriving from such comparison a reference command signal for the servo system effecting the advance of the electrode-tool relative to the workpiece.

29 Claims, 3 Drawing Figures

METHOD AND APPARATUS FOR POSITIONING AN ELECTRODE-TOOL RELATIVE TO A WORKPIECE IN ELECTRICAL DISCHARGE MACHINING

CROSS REFERENCE TO RELATED APPLICATIONS

The present application is a continuation-in-part of application Ser. No. 236,826, filed Mar. 22, 1972, now U.S. Pat. No. 3,739,136.

BACKGROUND OF THE INVENTION

In electrical discharge machining apparatus (EDM), the machining gap between the electrode-tool and the workpiece is conventionally controlled by means of a servo mechanism which automatically feeds the electrode-tool relatively to the workpiece at a predetermined rate of advance. The servo mechanism, generally a hydraulic or an electrical servo system, is controlled by command signals derived from the error, or difference, between a predetermined magnitude of reference characteristic and an achieved or regulated magnitude as provided as a feedback reference which is a function of the machining condition parameters, for example the average actual gap voltage between the electrode-tool and the workpiece.

In order to effectuate material removal from the workpiece at a maximum efficiency rate coupled with a minimum wear of the electrode-tool, it is necessary to continuously adapt the servo mechanism control commands to the changing machining conditions. This operation is effected manually by the machine operator, and the required corrections are done by him in an empiric manner as a result of his observations of the machining conditions. This requires considerable skill and experience on the part of the machine operator.

The present invention permits to effectuate such corrections to optimize the machining conditions automatically such as to approach as close as possible the conditions of maximum machining efficiency and minimum wear of the electrode-tool in every possible condition of machining, and under changing conditions, without requiring any special skill on the part of the operator.

The machining parameters utilized by the present invention for automatically initiating such corrective measures are, on one hand, the rate of average time delay occurring at random between the moment at which a machining voltage is applied across the gap and the moment at which there occurs an electrical discharge across the gap and, on the other hand, the rate of abnormal electrical discharges, more particularly the rate of short-circuited discharges.

It would theoretically be sufficient to effectuate a correction of the command signals as a function of one or the other of those two machining parameters. However, it has been found by experience that it is preferable and more convenient to effectuate a first correction in response to too high a rate of machining pulses presenting such random or uncertain delays and a second correction aiming at reducing the frequency of occurrence of short circuits across the gap, such as to approach as close as possible the machining conditions that provide maximum material removal rate and minimum electrode-tool wear.

By correctly balancing the corrections, which act in opposite directions upon the command signals, ideal conditions of operation are achieved. The double correction thus effected also permits to vary, at a period of several seconds, the machining gap between two extreme gap spacing dimensions situated on either side of the ideal gap dimension providing maximum efficiency.

The feedback signal representing the controlled or achieved gap spacing, which is a function of the machining parameters, may be obtained, for example, as a result of taking into consideration the average value of the machining peak voltage across the gap. It is particularly advantageous to utilize the method of the invention when the feedback signal is obtained by measuring the voltage between the electrode-tool and the workpiece during the period of time elapsing between the moment at which the electrical discharge begins and the moment at which it ends, rather than the moments themselves, and by storing the result in a memory between two consecutive electrical pulses.

SUMMARY OF THE INVENTION

The main object of the present invention therefore is to provide a process and apparatus for positioning an electrode-tool relative to a workpiece in an EDM machine, wherein interrupted machining electrical discharges are applied by means of controlled voltage-current pulses, in which the machining distance, or gap spacing, between the electrode-tool and the workpiece is automatically and adaptively controlled as a function of the error between a predetermined magnitude of reference command signal and a regulated or obtained magnitude, as represented by a feedback signal, depending upon the machining conditions. The reference command signal magnitude, and/or the regulated or achieved magnitude, is automatically corrected as a function of a first electrical reference obtained in response to the presence of random or uncertain time delay intervals between the moment at which each voltage pulse is applied across the machining gap and the moment at which the resulting electrical discharge begins, and a second electrical reference which is representative of the gap short circuit rate and which is obtained in response to the presence of pulses having a voltage, and/or a current, during discharge, which differs from a predetermined level, such that magnitude of the reference command signal decreases proportionally to the first electrical reference and increases proportionally to the second electrical reference, with the result that the machining gap is automatically and adaptively maintained proximate an optimum value at which the machining rate is maximum and the electrode-tool wear minimum.

Another object of the invention is to also provide an apparatus for practicing the method of the invention.

DESCRIPTION OF THE PREFERRED EMBODIMENT

Figure 1:
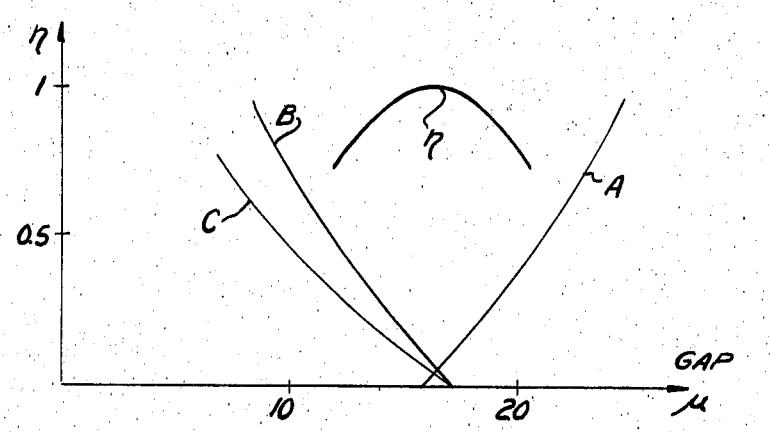
FIG. 1 is a diagram representing as a function of machining gap spacing diverse conditions of operation in EDM machining.

Referring now to FIG. 1 of the drawing, there is shown a diagram illustrating as a function of the distance between the electrode-tool and the workpiece in an EDM apparatus, or machining gap spacing expressed in microns on the ordinate axis, diverse curves corresponding respectively to the short circuit rate, the rate of average time delays between the establishment of a machining pulse voltage across the gap and the moment at which the electrical discharge begins, the machining efficiency or material removal rate, and the rate of wear of the electrode-tool. Curve A represents the time delay rate variation as a function of the gap spacing, and curve B represents the electrode-tool — workpiece short circuit rate. It can be seen that curves A and B reach their minimum value for a certain gap size, slightly less than $20\mu$ in the example chosen (or approximately 0.005 in.). Curve C represents the volumetric wear of the electrode-tool as a function of gap spacing, and the wear of the electrode-tool also reaches its minimum value for substantially the same gap spacing, while curve $\eta$, representing the machining efficiency, reaches its maximum value at substantially the same gap spacing of slightly less than $20\mu$. The diagram of FIG. 1 illustrates the importance of and the advantages derived by maintaining the machining gap spacing at a very precise value. It is obvious that when the gap spacing is greater than the optimum value, the average random time delay, as hereinbefore defined, is increased while when the gap dimension is below the optimum value the short circuit rate increases. In both cases, the efficiency decreases rapidly when the gap spacing is not maintained around the optimum value and, for narrow gap spacing narrower than the optimum value, the electrode-tool wear rate increases rather rapidly.

Figure 2:
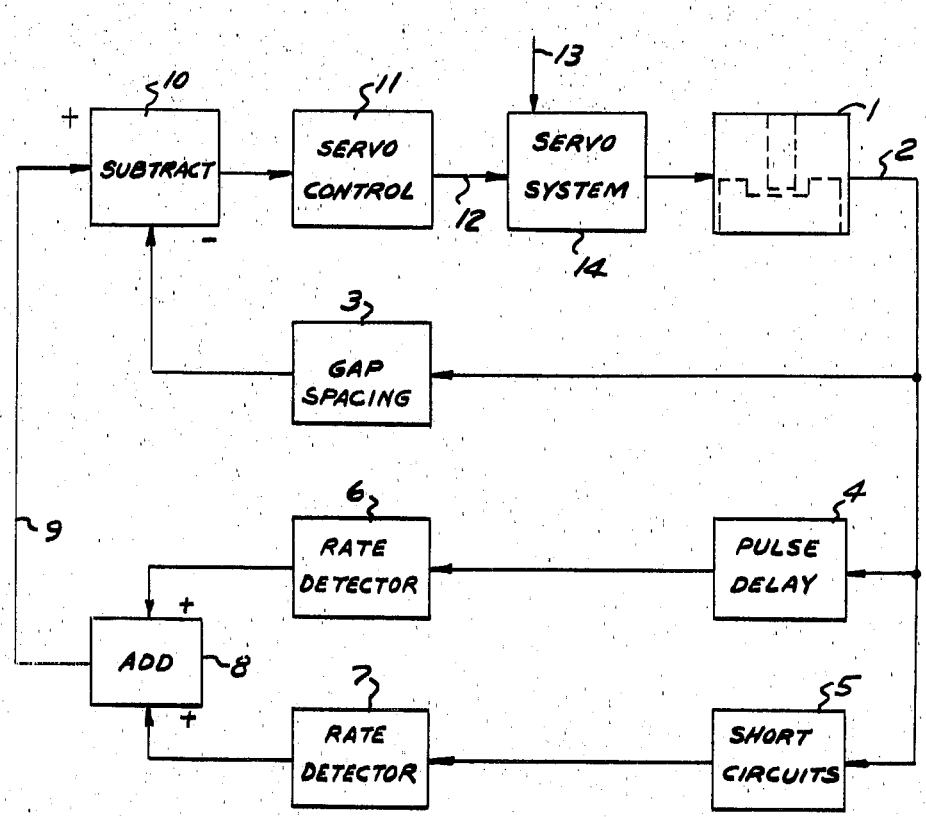
FIG. 2 is a simplified block diagram of the apparatus of the invention.

FIG. 2 represents a schematic block diagram of a system for controlling the machining gap for the purpose of constantly maintaining the machining gap spacing at its optimum value. Block 1 of the block diagram of FIG. 2 arbitrarily represents the machining zone or gap between the electrode-tool and the workpiece. Machining is effected across the gap by way of consecutive pulses having a certain peak voltage. The peak voltage of the first machining pulses is sensed and brought by a line 2 to three blocks, represented by numerals 3, 4 and 5, which take the form of appropriate electronic circuits for determining, respectively, the regulated or achieved spacing of the gap, the rate of the random time delay periods and the gap short circuit rate. The blocks 6 and 7, connected respectively at the output of the blocks 4 and 5, provide each at its output a voltage which is an analog representation of the output signal from the blocks 4 and 5. In this manner, two voltage signals are derived whose amplitudes represent respectively the random time delay rate and the short circuit rate. The voltage signal amplitude at the output of the block 6 decreases as a function of the random time delay rate, while the voltage amplitude at the output of the block 7 increases as a function of the short circuit rate.

The two voltage signals at the output of the blocks 6 and 7, respectively, are added in an adder 8, and the sum resulting from the addition of the two voltage signals is supplied by a line 9 to an input of a subtractor 10, having another input accepting a signal representative of the regulated machining gap spacing obtained from the block 3. The signal obtained at the output of the subtractor 10 is used as a command signal for the controller 11 which controls the servo system 14 feeding the electrode-tool towards the workpiece, or the workpiece towards the electrode-tool. The arrow 12 at the output of the controller 11 of the servo system designates symbolically that the controller causes the electrode-tool to advance toward the workpiece at the machining zone, therefore tending to narrow or "close" the gap, while the machining or material removal rate, illustrated symbolically by the arrow 13, acts upon the gap in a direction opposite to that of the electrode-tool feed, namely tending to widen or "open" the gap.

Figure 3:
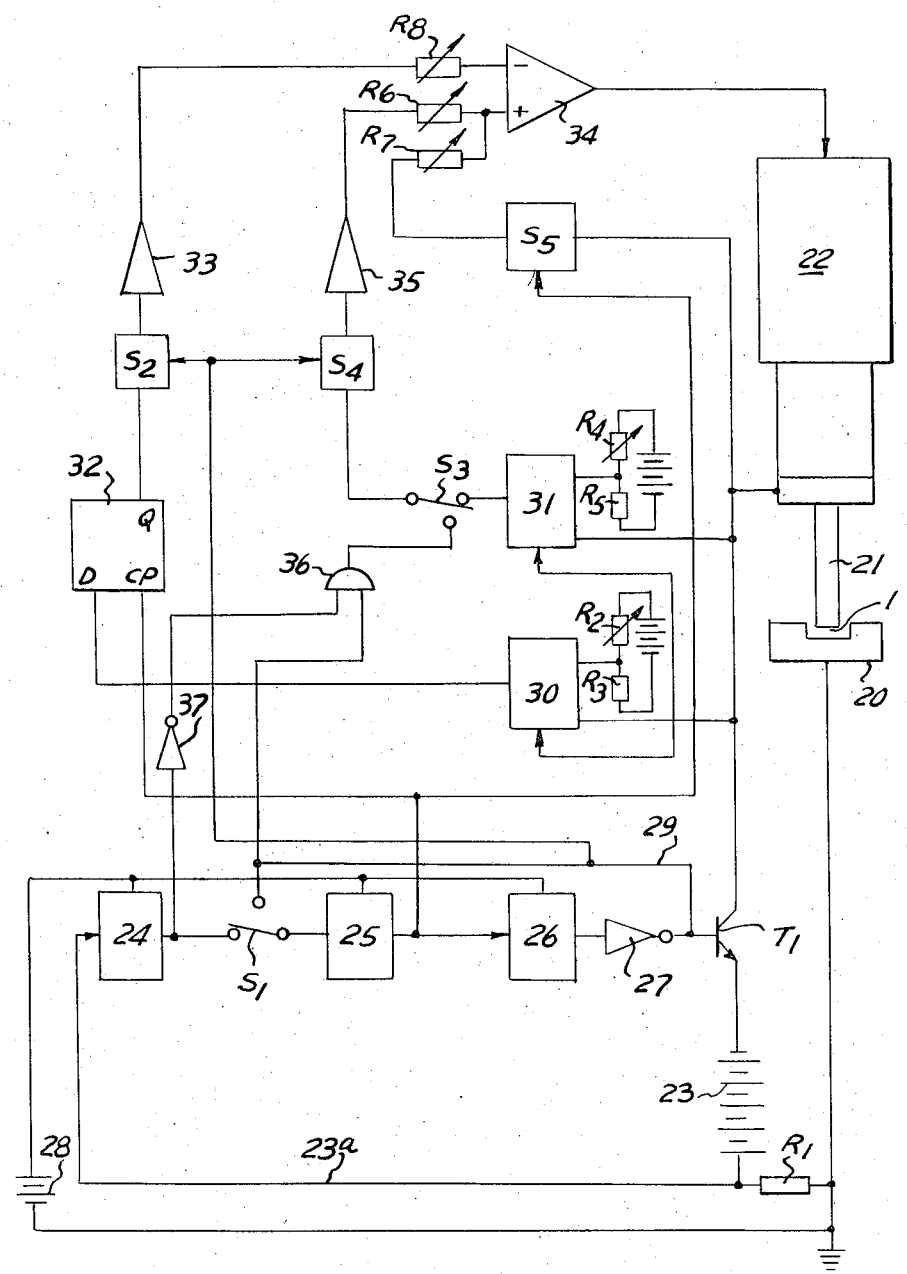
FIG. 3 is a more detailed schematic of the apparatus of the invention.

FIG. 3 is a schematic logic circuit diagram of an apparatus for practicing the process of the invention for automatically and adaptively controlling with precision the machining gap spacing between the electrode-tool and the workpiece. As shown at FIG. 3, the machining zone 1 is disposed between the workpiece 20 and the electrode-tool 21, whose displacement toward the workpiece is effected by a servo mechanism 22. The machining voltage-current pulses across the machining gap, immersed in a dielectric fluid, between the electrode-tool 21 and the workpiece 20 are controlled by a power transistor $T_1$ having its collector-emitter circuit in series in the machining gap circuit and are obtained from a DC source 23 of electrical energy. The power transistor $T_1$, which may consist of a single transistor or of a plurality of parallel transistors, operates as a switch for providing across the machining gap a series of consecutive DC machining pulses supplied by the source 23, as is well known in the art. Other details, such as the dielectric-coolant flow system, have been omitted for the sake of simplification of the description, as they form no part of the present invention.

It is well known that an electrical discharge is not established through the machining zone in coincidence with the establishment of a voltage differential between the electrode-tool and the workpiece, such that there is an uncertain time delay, which may randomly vary from one pulse to the next, between the moment at which the peak pulse voltage is applied across the machining gap and the moment at which electrical current begins to flow through the gap between the electrode-tool and the workpiece. A resistor $R_1$ is disposed in the machining circuit such that as soon as current flows across the machining gap the current flowing through the resistor $R_1$ causes a voltage drop across the resistor which is applied by a line 23a to the input of a trigger 24 which supplies at its output a signal of a form depending from the input voltage applied to the trigger. When a double-pole switch $S_1$ is in the position illustrated at FIG. 3, the output signal from the trigger 24 is applied through the switch $S_1$ to a monostable multivibrator 25 controlling in turn a second monostable multivibrator 26 whose output signal is applied, through an inverter 27, to the base of the transistor, or transistors, $T_1$. The trigger 24 and the multivibrators 25 and 26 are connected to a source of electrical energy 28 independent from the source 23. The time constant of the multivibrator 26 determines the duration of the time interval between two consecutive pulses, that is between the trailing edge of a current pulse and the leading edge of the voltage pulse providing the next current pulse across the gap. The multivibrator 25 determines the duration of the current pulse when its input is connected to the trigger 24. For that purpose, as soon as a current pulse appears across the gap subsequently to the application of a voltage pulse across the gap, the trigger 24 provides a signal which causes the multivibrator 25 to return, after a predetermined period of time, to its stable state. When the multivibrator 25 returns to its stable state it supplies at its output a signal that changes the state of the multivibrator 26 from its stable to its unstable state, and the current flowing through the collector-emitter circuit of the transistor $T_1$ is cut off for the period of time during which the multivibrator 26 is unstable.

The double-pole switch $S_1$ is provided with a second contact, permitting to connect the input of the multivibrator 25, through a line 29, directly to the base of the transistor $T_1$. When the switch $S_1$ is operated to connect the input of the multivibrator 25 directly to the base of the transistor $T_1$, the circuit is capable of providing across the machining gap voltage pulses of constant duration irrespective of the variation of the hereinbefore mentioned random time delays.

The circuit of FIG. 3 also comprises appropriate circuits to measure the rate of short circuits across the gap and the rate of random time delays, respectively. The short circuit rate is obtained by way of a detector 30, and the random time delay rate by way of a detector 31. The detector 30 takes the form of a differential amplifier having a first input to which is applied the gap voltage, reduced if necessary by means of a voltage divider, not shown, and a second input to which is applied an adjustable voltage reference obtained from a voltage divider formed by a variable resistor $R_2$ and a fixed resistor $R_3$ disposed across a source of reference voltage. The voltage reference applied to the second input of the differential amplifier 30 is less than the gap voltage for normal electrical discharges through the machining gap, and the differential amplifier, or detector, 30 provides an output signal only each time the gap voltage is less than the voltage reference, that is during the time interval between two consecutive pulses and also during the electrical discharge only in the event that a short-circuit between the electrode-tool and the workpiece drops the machining voltage below the voltage reference.

The output signal from the detector 30 is applied to the input D of a delay memory 32 providing a change in output signal only as soon as a signal is also applied to its other input terminal CP. The input terminal CP of the delay memory 32 is connected to the output of the monostable multivibrator 25 such that a signal is applied to the input terminal CP only during the duration of a machining pulse which, as previously explained, is determined by the monostable multivibrator 25 being in its unstable state. In this manner, the signal appearing at the output of the detector 30 at each interval of time between two consecutive pulses has no effect on the delay memory 32 because during that period of time in the course of which a signal appears at the output of the detector 30 there is no signal applied to the input terminal CP of the delay memory. However, as soon as a short circuit occurs at the machining gap the delay memory 32 provides at its output Q a signal which is applied, by way of an integrator amplifier 33 controlled by an electronic switch $S_2$, through an adjustable attenuator $R_8$ to an input of a differential amplifier 34. The electronic switch $S_2$ is controlled by the signals appearing at the output of the inverter 27, and is off as long as there is no output from the inverter 27.

The random time delay rate detector 31 is similar to the detector 30, but is arranged so as to provide an output signal each time that the voltage across the machining gap is higher than a voltage reference provided by an adjustable voltage divider $R_4$–$R_5$. The voltage divider $R_4$–$R_5$ is adjusted to provide a voltage slightly higher than the voltage across the gap during a normal machining discharge. The signal at the output of the detector 31 is applied, by way of a double-pole switch $S_3$, an electronic switch $S_4$, controlled from the output of the inverter 27, and an integrator 35, through one branch of an adjustable voltage divider $R_6$–$R_7$ to the second input of the differential amplifier 34. The electrode tool 21 is also connected through an electronic switch $S_5$ and the other branch of the voltage divider $R_6$–$R_7$ to the second input of the differential amplifier 34. The electronic switch $S_5$ is controlled by the output signals of the multivibrators 25 such as to be closed during each current discharge and open during the interval of time between two pulses, and also during the random time delay period.

The differential amplifier 34 provides an output signal which is a function of the difference between the two signals applied to its inputs, for the purpose of controlling the machining gap spacing towards a decrease in width when the signal representative of the random time delay rate is larger than the signal representative of the short circuit rate, and vice versa. However, in view of the connection between the electrode-tool 21 and the second input of the differential amplifier 34 through the adjustable resistor $R_7$ of the voltage divider $R_6$–$R_7$, the reference command signal for the servo mechanism 22 is also caused to be dependent upon the machining voltage.

The circuit of FIG. 3 also includes an alternative mode of operation permitting to obtain a signal as a function of the random time delay period by means other than the detector 31. To activate such alternative mode of operation, the double-pole switch $S_3$ is actuated to place its movable contact in engagement with a second stationary contact connected to the output of an AND gate 36, such as to connect the second input of the integrator amplifier 34 to the output of the gate rather than to the output of the detector 31. One of the two inputs of the AND gate 36 is connected to the output of the trigger 24 through an inverter 27, while the other input of the gate is connected directly to the base of the transistor, or transistors, $T_1$ through the line 29. In this manner, each time the transistor $T_1$ conducts at the same time that there is no signal at the output of the trigger 24 causing a signal to appear at the output of the inverter 27, that is each time a voltage is applied across the machining gap and the machining current does not yet flow, the gate 36 provides an output signal which is applied to the input of the integrator 35.

As the machining gap between the electrode-tool and the workpiece is controlled as a fucntion of the difference or error between the magnitude of reference command signal and the regulated value, or feedback signal value, it is obvious that instead of applying control or corrective siginals to the reference command signal, as precedingly described, such corrective signals may be applied to the regulated or achieved magnitude, as represented by the feedback signal magnitude.

Having thus described the invention by way of an example of structure contemplated for practicing the method of the invention,

What is claimed as new is as follows:

1. A method for positioning an electrode-tool relatively to a workpiece in an electro-erosion machining apparatus wherein interrupted electrical discharges are caused to occur across a machining gap between said electrode-tool and said workpiece by way of controlled voltage-current pulses and wherein the machining gap spacing between the electrode-tool and the workpiece is controlled by a command signal applied to a servo system, said method comprising obtaining a first electrical reference signal representative of the rate of random time delay intervals between the moment at which a voltage pulse is applied across the gap and the moment at which current begins to flow through the gap, obtaining a feedback electrical signal representative of the gap spacing between said electrode-tool and said workpiece at said machining gap, and subtracting the magnitude of said feedback signal from the magnitude of said reference signal for obtaining said command signal, wherein the machining gap spacing is maintained about an optimum value for which material removal rate is maximum and electrode-tool wear rate is minimum.

2. The method of claim 1 wherein said first electrical reference signal is a function of the average duration of random time delay intervals between the moment at which a machining voltage is applied across the gap and the moment at which current begins to flow through the gap.

3. The method of claim 1 wherein said first electrical reference signal is a function of the average ratio of the duration of random time delay intervals to the duration of the interval of time comprised between the beginning of a voltage pulse and the beginning of the next voltage pulse.

4. The method of claim 1 wherein said first electrical reference signal is a function of the average ratio of the duration of random time delay intervals to the duration of a voltage pulse across the gap.

5. The method of claim 1 wherein said first electrical reference signal is a function of the average ratio of the duration of the random time delay intervals to the duration of a current pulse across the gap.

6. The method of claim 1 wherein said first electrical reference siginal is a function of the ratio of the number of pulses for which the random time delay duration is greater than a predetermined value to a predetermined number of pulses applied across the machining gap.

7. The method of claim 1 further comprising obtaining a second electrical reference signal of a magnitude which is representative of the rate of gap short circuits and which is obtained in response to the occurrence across the gap of pulses for which one of the voltage and current parameters during an electrical discharge differs from a predetermined level, and comparing said first and said second electrical reference signals such that said command signal is modified to decrease the gap spacing as a function of a charge of said first electrical reference signal corresponding to an increase of the rate of random time delay intervals and of a modification of said second electrical reference signal corresponding to a decrease of the rate of gap short circuits, wherein the machining gap is maintained about an optimum value for which the material removal rate is maximum and the electrode-tool wear rate is minimum.

8. The method of claim 7 wherein said second electrical reference signal is obtained in response to the presence or absence of pulses for which the voltage between said electrode-tool and said workpiece during an electrical discharge is below a predetermined level.

9. The method of claim 8 wherein the signal which represents the machining voltage level during passage of current across the gap which is less than a predetermined level is stored during the time interval comprised between two consecutive current pulses for comparing to said predetermined level.

10. The method of claim 7 further comprising periodically varying said command signal for varying the machining gap spacing about its optimum value.

11. The method of claim 7 wherein said first electrical reference signal is a function of the average duration of random time delay intervals between the moment at which a machining voltage is applied across the gap and the moment at which current begins to flow through the gap.

12. The method of claim 7 wherein said first electrical reference signal is a fucntion of the average ratio of the duration of random time delay intervals to the duration of the interval of time comprised between the beginning of a voltage pulse and the beginning of the next voltage pulse.

13. The method of claim 7 wherein said first electrical reference signal is a function of the average ratio of the duration of random time delay intervals to the duration of a voltage pulse across the gap.

14. The method of claim 7 wherein said first electrical reference signal is a function of the average ratio of the duration of random time delay intervals to the duration of a current pulse across the gap.

15. The method of claim 7 wherein said first electrical reference signal is a function of the ratio of the number of pulses for which the random time delay duration is greater than a predetermined value to a predetermined number of pulses applied across the machining gap.

16. The method of claim 7 wherein said second electrical reference signal is a function of the average ratio of the time during which the machining voltage detected in the course of a current pulse is less than a predetermined level to a predetermined time interval.

17. The method of claim 7 wherein said second electrical reference signal is a function of the average ratio of the time interval during which the machining voltage detected in the course of a current pulse is less than a predetermined level to the time during which voltage is applied to the machining gap.

18. The method of claim 7 wherein said second electrical reference signal is a function of the average ratio of the time interval during which the machining voltage detected in the course of a current pulse is less than a predetermined level to the time during which current flows through the machining gap.

19. The method of claim 7 wherein said second electrical reference signal is a function of the ratio of the number of pulses for which the machining voltage during the passage of current through the gap is less than a predetermined level to a predetermined number of pulses applied across the machining gap.

20. A method for positioning an electrode-tool relatively to a workpiece in an electro-erosion machining apparatus wherein interrupted electrical discharges are caused to occur across a machining gap between said electrode-tool and said workpiece by way of controlled voltage-current pulses and wherein the machining gap spacing between the electrode-tool and the workpiece is controlled by a command signal applied to a servo system, said method comprising obtaining an electrical reference signal representative of the rate of gap short circuits in response to the occurrence across the gap of pulses for which one of the voltage and current parameters during an electrical discahrge differs from a predetermined level, obtaining a feedback electrical signal representative of the gap spacing between said electrode-tool and said workpiece at said machining gap, and subtracting the magnitude of said feedback signal from the magnitude of said reference signal for obtaining said command signal, wherein the machining gap spacing is maintained about an optimum value for which material removal rate is maximum and electrode-tool wear rate is minimum.

21. The method of claim 20 wherein said electrical reference signal is obtained in response to the presence or absence of pulses for which the voltage between said electrode-tool and said workpiece during an electrical discharge is below a predetermined level.

22. The method of claim 21 wherein the signal which represents the machining voltage level during passage of current across the gap being less than a predetermined level is stored during the time interval between two consecutive current pulses for comparing to said predetermined level.

23. The method of claim 20 wherein said electrical reference signal is a function of the average ratio of the average time interval during which the machining voltage detected in the couse of a current pulse is less than a predetermined level to the time during which voltage is applied to the machining gap.

24. The method of claim 20 wherein said electrical reference signal is a function of the average ratio of the time interval during which the machining voltage detected in the course of a current pulse is less than a predetermined level to the time during which current flows through the machining gap.

25. The method of claim 20 wherein said electrical reference signal is a function of the ratio of the number of pulses for which the machining voltage during the passage of current through the gap is less than a predetermined level to a predetermined number of pulses applied across the machining gap.

26. An apparatus for positioning an electrode-tool relative to a workpiece in an electro-erosion machining apparatus wherein interrupted electrical discharges occur across a machining gap between said electrode-tool and said workpiece by way of controlled voltage and current pulses and wherein the machining gap spacing between the electrode-tool and the workpiece is controlled as a function of a command signal of a predetermined magnitude applied to the input of servo system effecting the advance of the electrode-tool relative to the workpiece, said apparatus comprising means for applying electrical discharges across said machining gap, means for obtaining a feedback signal representative of the actual gap spacing, means for providing a first logic signal representative of the presence of random time delay intervals between the moment at which a voltage is applied across said machining gap and the moment at which current passes through said gap, means for providing a second logic signal representative of the presence during passage of current through said gap of a machining voltage which is less than a predetermined level, means for providing a first electrical magnitude representing the average value of said first logic signal, means for providing a second electrical magnitude representing the average value of said second logic signal, and means for obtaining said command signal by combining said first and second electrical magnitudes for obtaining a reference command signal and by combining said reference command signal and said feedback signal.

27. The apparatus of claim 26 further comprising means for obtaining said first logic signal by comparing the peak value of said machining voltage pulse with a predetermined reference level, said predetermined reference level being higher than the normal machining voltage during passage of current through the gap.

28. The apparatus of claim 26 further comprising means for storing said second logic signal during the interval of time between the end of a current pulse and the beginning of the next voltage pulse for comparison to said predetermined level.

29. The apparatus of claim 26 further comprising means for storing said second logic signal during the interval of time between the end of a current pulse and the beginning of the next current pulse for comparison to said predetermined level.

* * * * *